(12) United States Patent
Winiarski et al.

(10) Patent No.: US 11,660,817 B2
(45) Date of Patent: May 30, 2023

(54) METHODS FOR REMOVING LOOSE PARTICLES FROM AN OBJECT BUILT BY ADDITIVE MANUFACTURING

(71) Applicant: General Electric Company, Schenectady, NY (US)

(72) Inventors: Daniel Winiarski, Bad Staffelstein (DE); Frank Schodel, Kronach (DE); Kathrin Hofmann, Kronach (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/761,672

(22) PCT Filed: Nov. 2, 2018

(86) PCT No.: PCT/US2018/058856
§ 371 (c)(1),
(2) Date: May 5, 2020

(87) PCT Pub. No.: WO2019/094276
PCT Pub. Date: May 16, 2019

(65) Prior Publication Data
US 2021/0178692 A1 Jun. 17, 2021

Related U.S. Application Data

(60) Provisional application No. 62/584,183, filed on Nov. 10, 2017.

(51) Int. Cl.
*B29C 64/357* (2017.01)
*B29C 64/35* (2017.01)
(Continued)

(52) U.S. Cl.
CPC .............. *B29C 64/35* (2017.08); *B22F 10/28* (2021.01); *B22F 10/68* (2021.01); *B22F 10/73* (2021.01);
(Continued)

(58) Field of Classification Search
CPC ......... B29C 64/357; B22F 10/68; B22F 12/30
See application file for complete search history.

(56) References Cited

U.S. PATENT DOCUMENTS 7,357,629 B2  4/2008  Weiskopf et al.
7,648,664 B2  1/2010  Teal et al.
(Continued)

FOREIGN PATENT DOCUMENTS

DE   202013009787 U1   12/2016
EP       3167980 A1    5/2017
(Continued)

OTHER PUBLICATIONS

PCT International Search Report Corresponding to PCT/US2018/058856 dated Feb. 4, 2019.

*Primary Examiner* — Jacob T Minskey
*Assistant Examiner* — Adrien J Bernard
(74) *Attorney, Agent, or Firm* — Dority & Manning, P.A.

(57) ABSTRACT

Methods for removing an object from powder after forming the object in an additive manufacturing apparatus are provided. The method may include: positioning a cover over a build platform with the object being positioned within a powder; removing the build platform from the additive manufacturing apparatus with the cover positioned over the build platform; and thereafter, removing the powder from the build platform to expose the object.

19 Claims, 4 Drawing Sheets

(51) Int. Cl.
  *B33Y 10/00* (2015.01)
  *B29C 64/153* (2017.01)
  *B29C 64/245* (2017.01)
  *B33Y 40/20* (2020.01)
  *B22F 10/68* (2021.01)
  *B22F 10/73* (2021.01)
  *B22F 12/30* (2021.01)
  *B22F 10/28* (2021.01)
  *B33Y 40/00* (2020.01)
  *B22F 12/37* (2021.01)
  *B22F 12/00* (2021.01)

(52) U.S. Cl.
  CPC .............. *B22F 12/30* (2021.01); *B22F 12/37* (2021.01); *B29C 64/153* (2017.08); *B29C 64/245* (2017.08); *B29C 64/357* (2017.08); *B33Y 10/00* (2014.12); *B33Y 40/00* (2014.12); *B33Y 40/20* (2020.01); *B22F 12/22* (2021.01)

(56) References Cited

U.S. PATENT DOCUMENTS

| | | | |
|---|---|---|---|
| 7,690,909 | B2 | 4/2010 | Wahlstrom |
| 8,083,513 | B2 | 12/2011 | Montero-Escuder et al. |
| 8,678,805 | B2 | 3/2014 | Vermeer et al. |
| 9,597,730 | B2 | 3/2017 | Mironets et al. |
| 9,643,357 | B2 | 5/2017 | Farah et al. |
| 2016/0279871 | A1 | 9/2016 | Heugel et al. |
| 2017/0282248 | A1 | 10/2017 | Ljungblad et al. |
| 2018/0193887 | A1* | 7/2018 | Pourcher ................. B29C 64/35 |
| 2019/0009338 | A1 | 1/2019 | McMurtry et al. |

FOREIGN PATENT DOCUMENTS

| | | |
|---|---|---|
| WO | WO2017/017274 A1 | 2/2017 |
| WO | WO2017/051029 A1 | 3/2017 |
| WO | WO2017/121995 A1 | 7/2017 |

* cited by examiner

METHODS FOR REMOVING LOOSE PARTICLES FROM AN OBJECT BUILT BY ADDITIVE MANUFACTURING

PRIORITY INFORMATION

The present applicant claims priority to U.S. Provisional Patent Application Ser. No. 62/584,183 titled "Methods for Removing Loose Particles from an Object Built by Additive Manufacturing" filed on Nov. 10, 2017, the disclosure of which is incorporated by reference herein.

FIELD

The present disclosure generally relates to methods and systems adapted to perform additive manufacturing ("AM") processes, for example by direct melt laser manufacturing ("DMLM"), on a larger scale format.

BACKGROUND

Additive manufacturing ("AM") processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering ("DMLS") or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Generally, the part must be removed from the apparatus while it is on the build platform. Post processing procedures include removal of excess powder by, for example, blowing or vacuuming. Other post processing procedures include a stress release process. Additionally, thermal and chemical post processing procedures can be used to finish the part. For example, the build part is driven after the build job to the unpacking area, where powder and part is separated from each other. However, there remains a need for an improved large format powder manufacturing system, along with methods of its use.

BRIEF DESCRIPTION

Aspects and advantages will be set forth in part in the following description, or may be obvious from the description, or may be learned through practice of the invention.

Methods are generally provided for removing an object from powder after forming the object in an additive manufacturing apparatus. In one embodiment, the method includes: positioning a cover over a build platform with the object being positioned within a powder; removing the build platform from the additive manufacturing apparatus with the cover positioned over the build platform; and thereafter, removing the powder from the build platform to expose the object.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Figure 1:
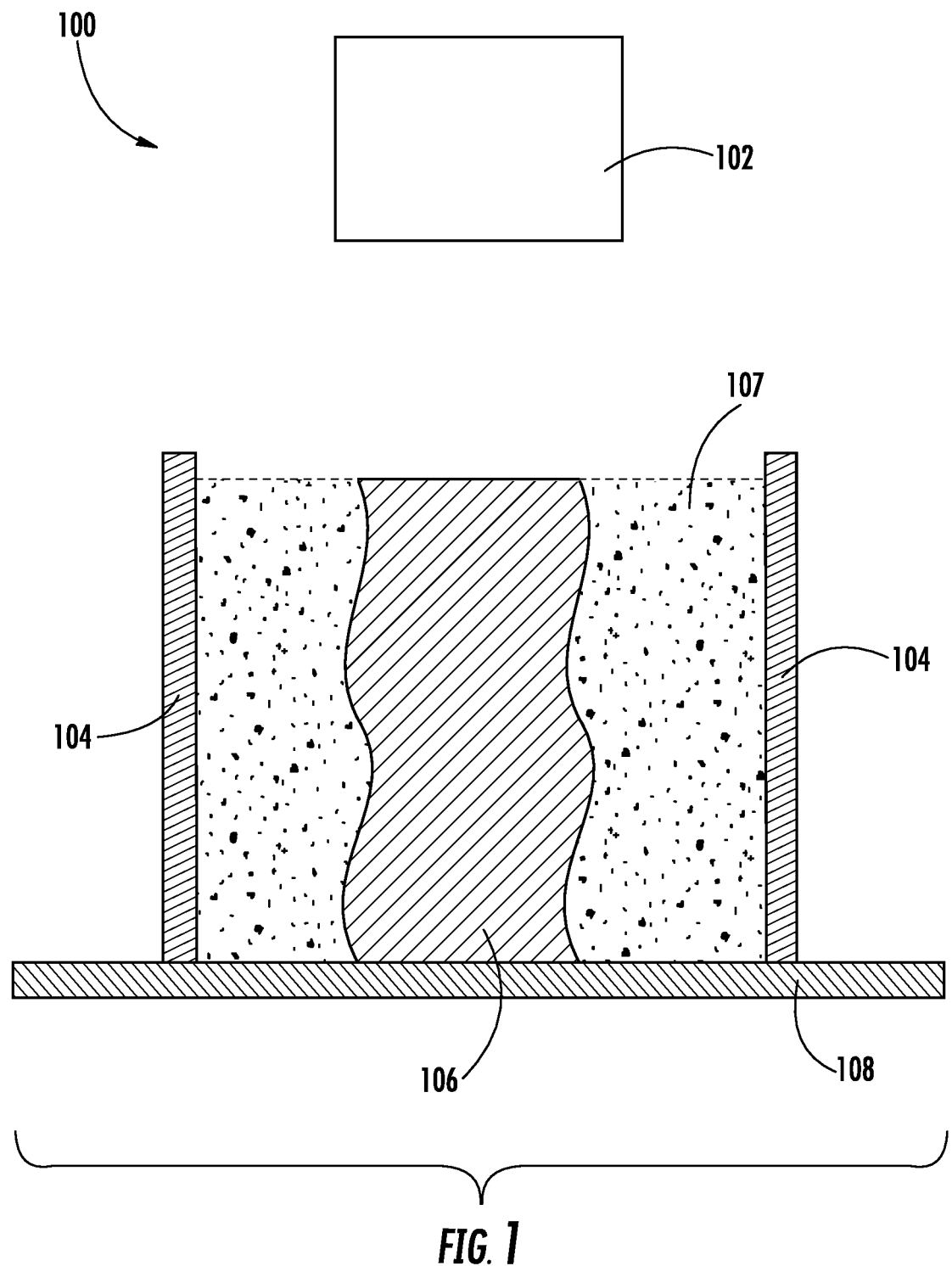
FIG. 1 shows an exemplary large scale additive manufacturing apparatus according to an embodiment of the invention.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Methods and apparatus are generally provided for collecting an additively manufactured object from a build platform. In particular, methods and apparatus are provided for handling of a build object after its formation within an additive manufacturing apparatus, particularly with respect to loose powder remaining on the build platform with the object. For example, the present methods and apparatus may reduce powder spillage and facilitate recycling of loose powder after the build process.

As such, methods are provided that can be used to perform additive manufacturing, as well as methods for utilizing the apparatus to additively manufacture objects. The apparatus includes components that make it particularly useful for making large additively manufactured objects through powder management of the build area, particularly after the build process is completed. In one particular embodiment, a build unit may be used to include several components necessary for making high precision, large scale additively manufactured objects, which may include, for example, a recoater, a gasflow device with a gasflow zone, and an irradiation emission directing device. An irradiation emission directing device used in an embodiment of the present invention may be, for example, an optical control unit for directing a laser beam. An optical control unit may comprise, for example, optical lenses, deflectors, mirrors, and/or beam splitters. Advantageously, a telecentric lens may be used. Alternatively, the irradiation emission directing device may be an electronic control unit for directing an e-beam. The electronic control unit may comprise, for example, deflector coils, focusing coils, or similar elements.

The build unit may be attached to a positioning system (e.g. a gantry, delta robot, cable robot, robot arm, belt drive, etc.) that allows three dimensional movement throughout a build environment, as well as rotation of the build unit in a way that allows coating of a thin powder layer in any direction desired.

FIG. 1 shows an example of one embodiment of a large-scale additive manufacturing apparatus 100 according to the present invention. The apparatus 100 comprises a build unit 102, which may include, but is not limited to, a positioning unit, an irradiation emission directing device, and a laminar gas flow zone. The maximum build area may be defined by the positioning system, instead of by a powder bed as with conventional systems, and the build area for a particular build can be confined to a build envelope 104 that may be dynamically built up along with the object 106, which are both built on the build platform 108. Any multi-dimensional positioning system may be utilized to move the build unit 102 in x-, y-, and z-directions, such as a gantry system, a delta robot, cable robot, robot arm, etc. In certain embodiments, the irradiation emission directing device may be independently moved inside of the build unit 102 by a second positioning system (not shown).

The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser beam irradiation is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. When the irradiation source is an electron source, then the electron source originates the electrons that comprise the e-beam that is directed by the irradiation emission directing device. When the irradiation source is an electron source, then the irradiation emission directing device may be, for example, a deflecting coil. When a large-scale additive manufacturing apparatus according to an embodiment of the present invention is in operation, if the irradiation emission directing devices directs a laser beam, then generally it is advantageous to include a gasflow device providing substantially laminar gas flow to a gasflow zone. If an e-beam is desired, then no gasflow is provided. An e-beam is a well-known source of irradiation. When the source is an electron source, then it is important to maintain sufficient vacuum in the space through which the e-beam passes. Therefore, for an e-beam, there is no gas flow across the gasflow zone.

The apparatus 100 allows for a maximum angle of the beam to be a relatively small angle to build a large part, because the build unit 102 can be moved to a new location to build a new part of the object 106 being formed. In certain embodiments, two or more build units 100 may be utilized to build one or more object(s) 106. The number of build units, objects, and their respective sizes are only limited by the physical spatial configuration of the apparatus.

Upon completion of the object 106 on the build platform 102, the loose powder 107 may be removed so as to expose the object 106. In certain embodiments, loose powder 107 may be contained within the build envelope 104 and around the object 106. Additionally, loose powder 202 may be outside of the build envelope 104, which may be a result of spillage during the build process. In one embodiment, the loose powder 107 may be removed from the build platform in a powder collection or unpacking apparatus that is external to the additive manufacturing apparatus 100. For example, the build platform 102 may be transported from the additive manufacturing apparatus 100 to the powder collection or unpacking apparatus.

In one embodiment, the cover 200 may be secured so as to form a fluidly sealed inner chamber 201 between the cover 200 and the base plate 110.

Figure 2:
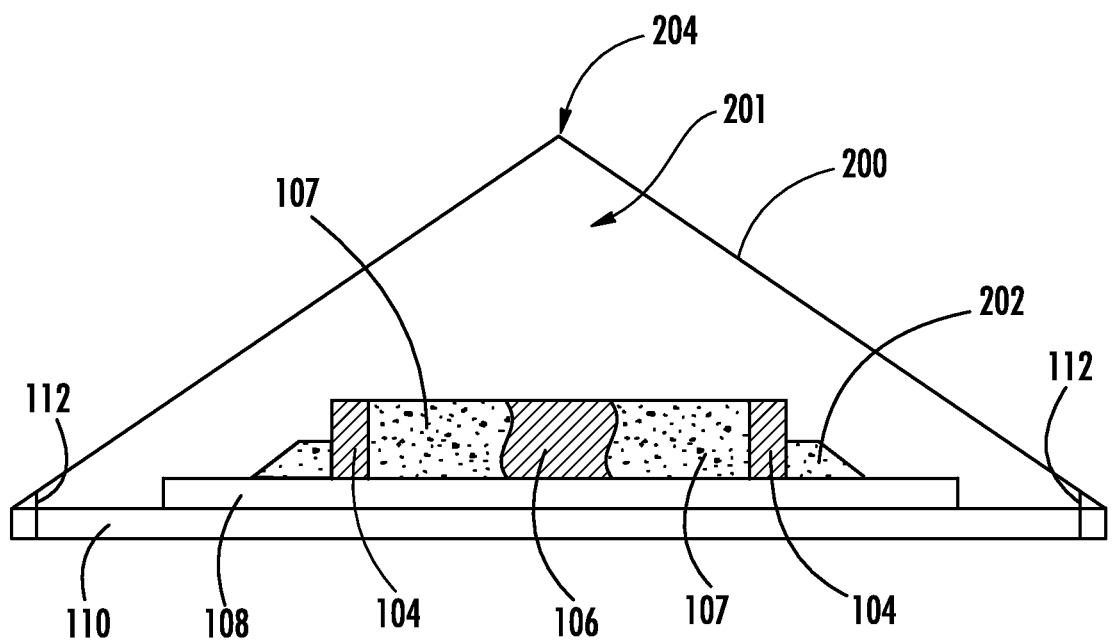
FIG. 2 shows a cross-sectional view of a build platform having an exemplary cover thereon according to an embodiment of the invention.

Referring to FIG. 2, a cover 200 is positioned over the build platform 102 with the object 106 positioned within the powder 107 (e.g., between the build envelope 104). In the embodiments shown, the build platform 102 is positioned on a base plate 110. For example, the build platform 102 may be secured to the base plate 110, such as via a mechanical fastener 112, such as a series of bolts, screws, clamps, or other devices. In particular embodiments, the cover is secured such that loose powder remains contained within the build platform 102 and the cover 200 or, if present, the base plate 110 and the cover 200.

As shown, the cover 200 has a pyramidal shape with an apex 204 at the top of the cover 200. However, other shapes may be utilized, as desired.

Figure 3:
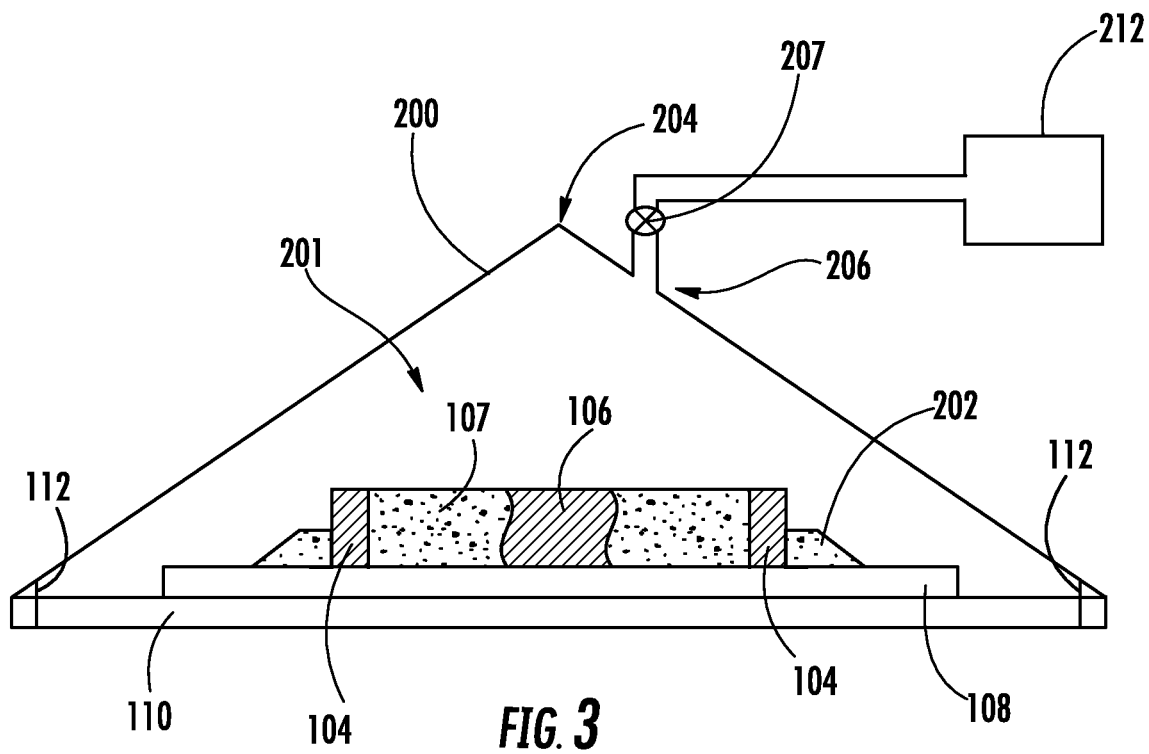
FIG. 3 shows a cross-sectional view of a build platform having another exemplary cover thereon according to an embodiment of the invention.
Figure 4:
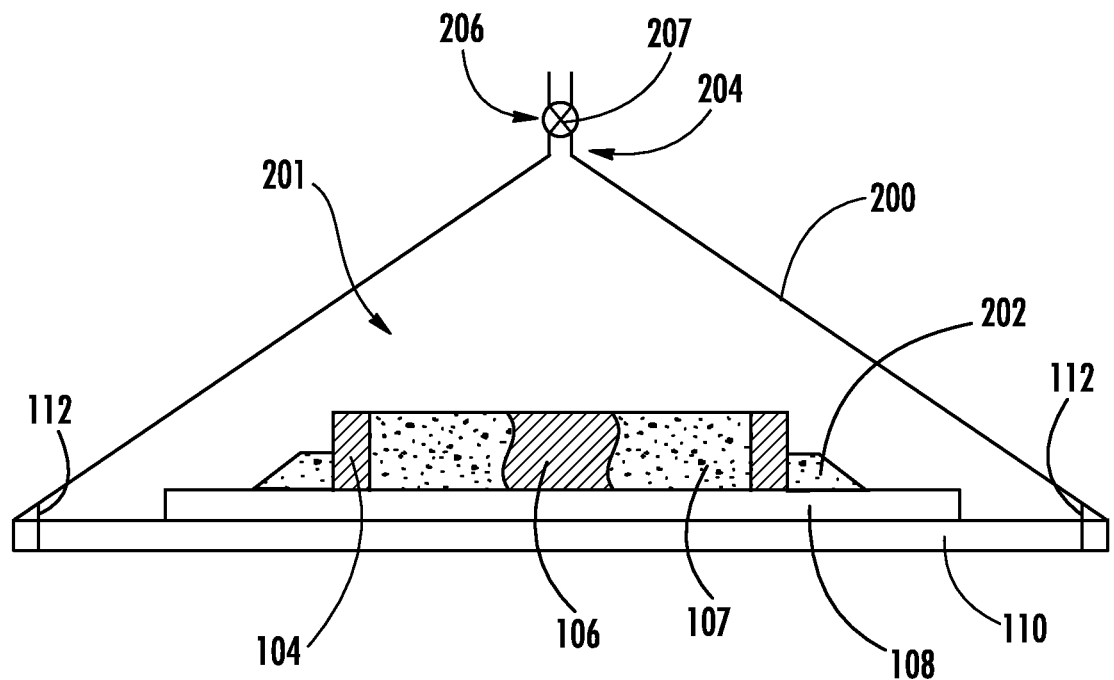
FIG. 4 shows a cross-sectional view of a build platform having yet another exemplary cover thereon according to an embodiment of the invention.

A port 206 may be present in the cover 200, such as shown in FIGS. 3 and 4. Referring to FIG. 3, for example, a vacuum system 212 may be connected to the port 206 within the cover 200 so as to draw a vacuum within the inner chamber 201, particularly embodiments when the inner chamber 201 is fluidly sealed. As such, the vacuum 212 may draw the loose powder 107, 202 from the build platform 108. In one embodiment, a valve 207 may be included in the port 206 to control the vacuum flow.

Figure 5:
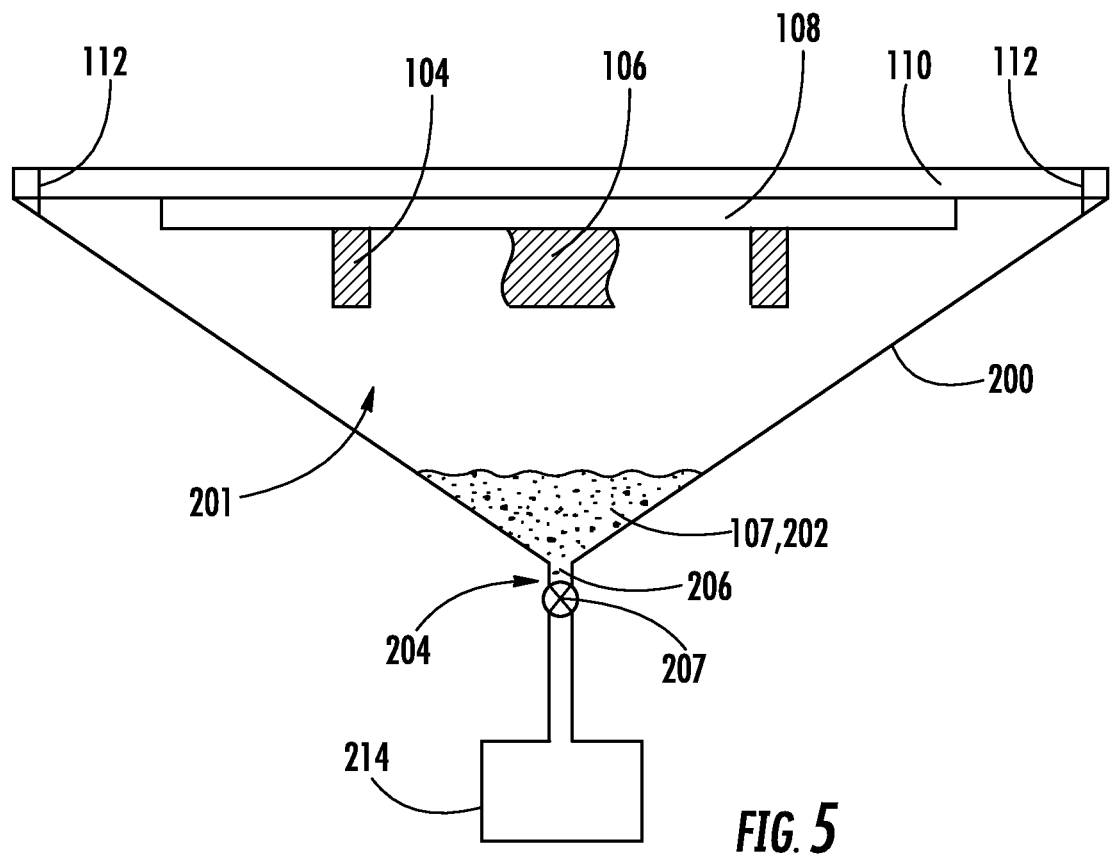
FIG. 5 shows a cross-sectional view of the build platform of FIG. 4 while inverted according to one method of removing loose particles from the build platform.

Referring to FIG. 4, the port 206 may be positioned at the apex 204 of the cover 200. In such an embodiment, the loose powder 107, 202 may be removed by rotating the build platform 108 such that the powder 107, 202 falls into the cover 200 and then collecting the powder 107, 202 through the port 206 within the top position of the cover 200. For instance, the build platform 108 may be inverted such that all of the loose powder 107, 202 falls into the apex 204 of the cover 200. FIG. 5 shows a collection system 214 may be connected to the port 206 within the cover 200 so as to draw a collect the loose powder 107, 202. In one embodiment, the build platform may be vibrated to shake the loose powder 107, 202 into the cover 200 for removal from the build platform. After collection of the loose powder 107, 202, the build platform may be rotated to its original orientation.

Figure 6:
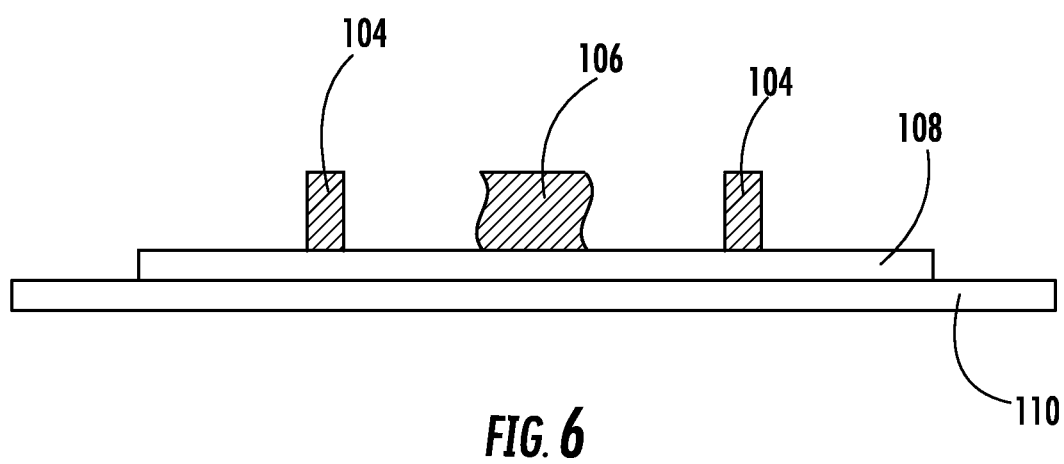
FIG. 6 shows a cross-sectional view of a build platform after removal of loose particles therefrom according to an embodiment of the invention.

Upon collection of the loose powder 107, 202, the cover 200 may be removed to expose the object on the build platform 108, without the presence of any significant amount of loose powder 107, 202, as shown in FIG. 6. As such, the object 106 may be removed from the build platform 108 without any significant spillage of loose powder from the build platform 108. Additionally, the loose powder 107, 202 may be recycled back for use in the additive manufacturing apparatus 100.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for removing an object from powder after forming the object in an additive manufacturing apparatus, the method comprising:
    positioning a cover over a build platform supporting the object and a build envelope, wherein the object is positioned within a powder;
    securing the cover over the build platform to form a sealed inner cavity containing the object and the build envelope;
    removing the build platform from the additive manufacturing apparatus with the cover positioned over the build platform; and
    thereafter, removing the powder from the build platform to expose the object.

2. The method of claim 1, wherein the cover is secured to the build platform such that the powder is contained within the cover and the build platform.

3. The method of claim 1, wherein the build platform is secured on a base plate, and wherein the cover is secured to the base plate such that the powder is contained within the cover and the build platform.

4. The method of claim 1, wherein the powder is vacuumed off of the build platform with the cover positioned thereon.

5. The method of claim 4, wherein the cover includes a port configured to connect to a vacuum to remove the powder from the build platform.

6. The method of claim 4, wherein removing the powder from the build platform to expose the object comprises:
    connecting a vacuum line to a port within the cover; and
    suctioning the powder through the port to remove the powder from the build platform.

7. The method of claim 1, wherein the cover includes a port in a top position of the cover.

8. The method of claim 7, wherein removing the powder from the build platform to expose the object comprises:
    rotating the build platform such that the powder falls into the cover; and
    collecting the powder through the port within the top position of the cover.

9. The method of claim 8, wherein the cover has a pyramidal shape with an apex, and wherein the port is defined at the apex.

10. The method of claim 8, wherein rotating the build platform comprises inverting the build platform.

11. The method of claim 8, further comprising:
    vibrating the build platform such that the powder is shaken from the object.

12. The method of claim 8, further comprising:
    rotating the build platform to its original orientation; and
    removing the cover such that the object is exposed thereon.

13. The method of claim 1, wherein the object is positioned within the build envelope with the powder positioned between the build envelope.

14. The method of claim 1, further comprising:
    collecting the powder removed from the build platform; and
    recycling the collected powder for use in the additive manufacturing apparatus.

15. A method for removing an object from powder after forming the object in an additive manufacturing apparatus, the method comprising:

positioning a cover over a build platform with the build platform positioned in the additive manufacturing apparatus, wherein the object is positioned within a powder;

removing the build platform with the cover positioned over the build platform from the additive manufacturing apparatus; and thereafter, removing the powder from the build platform to expose the object.

16. The method of claim 15, further comprising:

securing the build platform on a base plate; and securing the cover to the base plate such that powder is contained between the cover and the base plate.

17. The method of claim 15, wherein positioning the cover over the build platform further includes positioning the cover over a build envelope formed on the build platform.

18. The method of claim 16, further comprising rotating the build platform, the base plate, and the cover such that the powder falls into the cover.

19. The method of claim 18, further comprising connecting a vacuum line to a port within the cover.

\* \* \* \* \*